April 25, 1933.  E. F. KIECKHEFER  1,905,176
METHOD OF AND MEANS FOR PREPARING LAWNS
Filed June 13, 1932
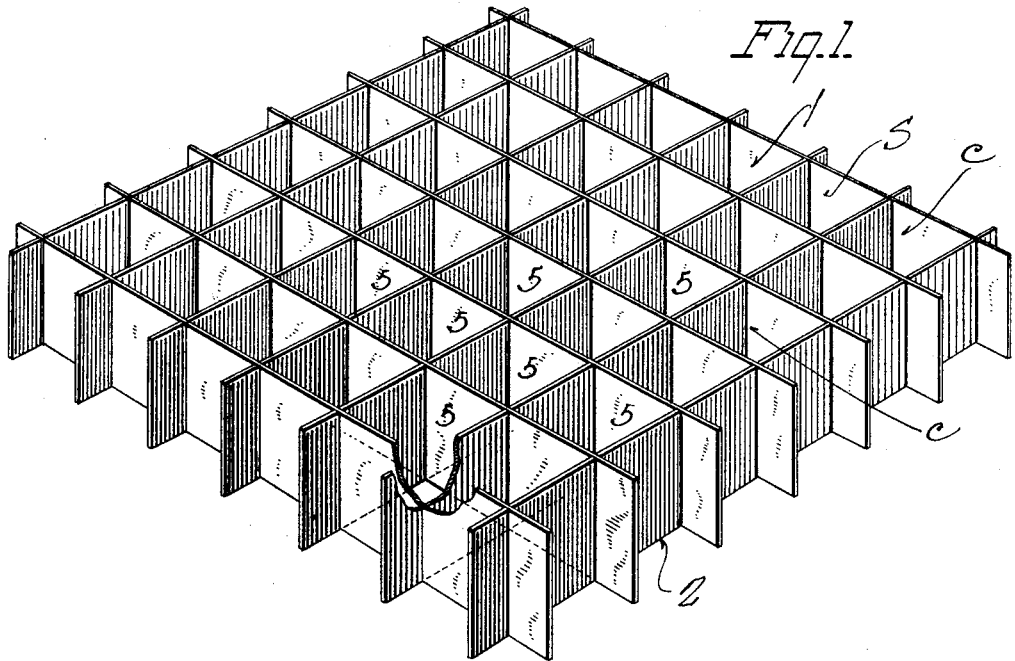
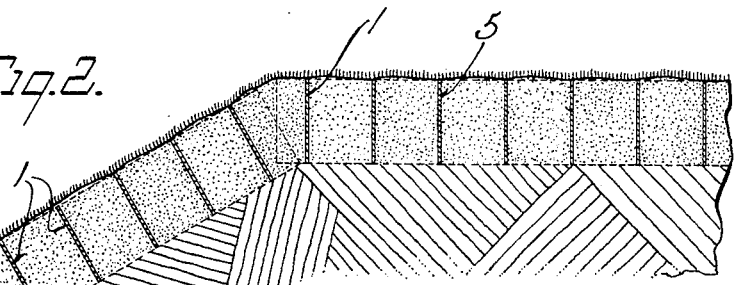
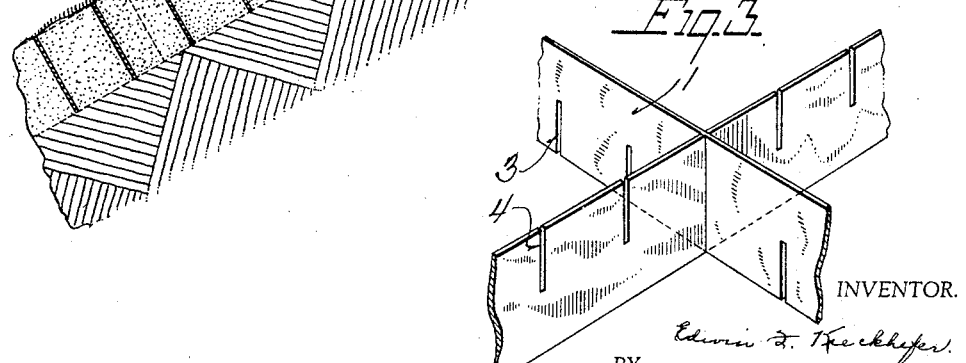
INVENTOR.
Edwin F. Kieckhefer.
BY
Bottum, Hudnall, Lecher,
McNamara & Michael
ATTORNEYS Patented Apr. 25, 1933

1,905,176

UNITED STATES PATENT OFFICE

EDWIN F. KIECKHEFER, OF WAUWATOSA, WISCONSIN

METHOD OF AND MEANS FOR PREPARING LAWNS

Application filed June 13, 1932. Serial No. 616,795.

This invention relates to a method of and means for preparing or building lawns.

It is well known that a seeded lawn is to be preferred over sodding and the like. However, it is difficult to grow a stand of grass from seed unless the surface soil is properly prepared and the ground fairly level and well exposed to sunlight.

One of the principal objects of the present invention is to provide a convenient and practical mode of obtaining a good stand of grass from the seed and this even though the area is more or less shady, hilly or terraced.

In carrying out the present invention, intersecting strips or partition-like members are laid on the ground to be seeded, the strips preferably intersecting each other at right angles and being interfitted at the point of intersection in any suitable manner. The strips are constituted of a composition of fibers or pulp in which fertilizer is incorporated.

The entire surface of the ground is covered with strips of this character and surface soil is then scattered thereon, filling all of the small compartments defined by the interfitting strips. Seed is then sown and the soil is wet down. The pulp or pasteboard strips absorb a good portion of the moisture and have the property of retaining the moisture and giving it off gradually to the soil.

One of the main purposes of the interfitting pulp sections is their action in retaining the surface soil against washing away due to rains or other causes. The pulp-like sections, after the grass has obtained a good growth and is well rooted, slowly disintegrate or dissolve so that eventually they are completely absorbed in the earth. The fertilizer ingredients in the pulp of the strips serves to strengthen the soil as the disintegration progresses and during the period of disintegration the pulp still retains its property of absorbing moisture and giving it off slowly to the earth thereby retaining the earth moist over longer periods than would otherwise be the case.

In the drawing:

Figure 1 is a perspective view showing one type of structure which may be employed in carrying out the present invention;

Figure 2 shows the manner of building up the lawn; and

Figure 3 is a fragmentary perspective view showing one manner of interfitting the intersection strips.

Referring to the drawing, the numeral S designates generally one type of strip assembly or strip section which is laid on the ground. It is to be understood, of course, that a sufficient number of such sections are provided to cover the entire surface of the ground to be seeded. The sections consist of parallel strips 1 which are intersected by strips 2, the strips 2 being parallel to each other and being disposed at an angle, preferably a right angle, to the strips 1. At the points of their intersections the strips 1 may have slots 3 extending from their lower edges to a point half way between their edges and similarly the strips 2 may have slots 4 extending from their upper edges to a point midway between their edges. The slots provide for the interfitting of the strips 1 and 2 in the manner illustrated in the drawing.

In use, the sections are laid on the ground with their strips resting on their lower edges and vertically disposed. The soil is then scattered over the ground and over the sections S to fill all of the small compartments 5 and to come flush with or just above the upper edges of the strips. The lawn is then seeded. After the seeding the lawn is thoroughly wetted down and the strips, due to their composition, absorb a good portion of the moisture. As explained, the strips 1 and 2 are made up of pulp board constituted of fiber or pulp similar to cardboard, pasteboard, or the like, and have incorporated therein suitable fertilizer whereby to enrich the ground and keep it moist as well as to retain the surface soil in place.

While I have shown and described one structure to illustrate the invention, obviously various changes in size, shape, arrangement and composition of the parts may be made without departing from the spirit of the invention or the scope of the subjoined claims.

The invention claimed is:

1. The hereindescribed method of preparing or building lawns which consists in suitably preparing the ground, laying on the surface of the ground, intersecting and interfitted strip-like members constituted of pulp board impregnated with fertilizer whereby to define a multiplicity of small compartments, scattering surface soil over the ground until said compartments are filled, seeding the surface soil, and finally wetting down the soil, whereby the strip-like members retain the surface soil and also absorb moisture and give it off gradually to the soil, the strip-like members being constituted of fertilizing impregnated pulp board serving to enrich the soil as they gradually disintegrate and become absorbed in the soil.

2. The hereindescribed method of preparing or building lawns which consists in suitably preparing the ground, laying on the surface of the ground, intersecting and interfitted strip-like members constituted of pulp board whereby to define a multiplicity of small compartments, scattering surface soil over the ground until said compartments are filled, seeding the surface soil, and finally wetting down the soil, whereby the strip-like members retain the surface soil and also absorb moisture and give it off gradually to the soil, the strip-like members being constituted of pulp board serving to enrich the soil as they gradually disintegrate and become absorbed in the soil.

3. The hereindescribed method of building lawns which consists in suitably preparing the ground, laying on the ground intersecting and interfitted strip-like members consisting of pulp board whereby to define a multiplicity of small compartments, scattering surface surface soil over the ground to fill said compartments, and seeding the surface soil whereby the strip-like members retain the surface soil and absorb moisture when the ground is wetted and later gradually give off the moisture so absorbed to the soil, said strip-like members eventually disintegrating and being absorbed in the soil.

4. In the art of building lawns, a step which consists in placing upon the ground to be seeded intersecting and interfitted strip-like members constituted of pulp board and adapted to retain surface soil to absorb moisture and gradually give it off to the soil and eventually to disintegrate and become absorbed in the soil.

5. A device of the character described adapted for use in building lawns consisting of a plurality of strip-like sections arranged on edge and supported directly on the surface of the ground, certain of said strips intersecting and being interfitted with others of the strips to define a plurality of compartments for the reception of surface soil, said strips being constituted of pulp board impregnated with fertilizer whereby the strips have the property of absorbing the moisture and giving it off gradually to the soil, of retaining the top soil and of being eventually absorbed by the soil.

6. A device of the character described adapted for use in building lawns consisting of a plurality of strip-like sections arranged on edge and supported directly on the surface of the ground, certain of said strips intersecting and being interfitted with others of the strips to define a plurality of compartments for the reception of surface soil, said strips being constituted of pulp board whereby the strips have the property of absorbing the moisture and giving it off gradually to the soil, of retaining the top soil and of being eventually absorbed by the soil.

7. In a device of the character described, means for retaining the surface soil consisting of compartment defining wall members constituted of pulp board impregnated with fertilizer, said wall members having the property of absorbing moisture when soil in the compartments is wetted and of giving off such moisture gradually to the soil, said wall members eventually disintegrating and being absorbed in the soil.

8. In a device of the character described, means for retaining the surface soil consisting of compartment definining wall members constituted of pulp board, said wall members having the property of absorbing moisture when soil in the compartments are wetted and of giving off such moisture gradually to the soil, said wall members eventually disintegrating and being absorbed in the soil.

In witness whereof, I hereto affix my signature.

EDWIN F. KIECKHEFER.